US006227836B1

(12) United States Patent
Kato et al.

(10) Patent No.: US 6,227,836 B1
(45) Date of Patent: May 8, 2001

(54) APPARATUS FOR MANUFACTURING TABLETS

(75) Inventors: Heizaburo Kato, Shizuoka-ken; Yuki Tsushima, Honjo; Takayuki Ohwaki, Inuyama; Masaharu Nakajima, Saitama-ken; Yutaka Morita, Honjo, all of (JP)

(73) Assignee: Sankyo Seisakusho Co & Eisai Co., Ltd. (JP)

( * ) Notice: Subject to any disclaimer, the term of this patent is extended or adjusted under 35 U.S.C. 154(b) by 0 days.

(21) Appl. No.: 09/501,012

(22) Filed: Feb. 9, 2000

Related U.S. Application Data

(62) Division of application No. 08/833,244, filed on Apr. 17, 1997, now Pat. No. 6,074,586, which is a division of application No. 08/494,924, filed on Jun. 26, 1995, now Pat. No. 5,672,364.

(30) Foreign Application Priority Data

Jul. 7, 1994 (JP) ........................................ 06-155899
Jul. 8, 1994 (JP) ........................................ 06-157344

(51) Int. Cl.$^7$ ........................................ B29C 43/06

(52) U.S. Cl. .............................. 425/89; 425/90; 425/100; 425/103; 425/345; 425/347; 425/353; 425/356

(58) Field of Search .............................. 425/89, 90, 100, 425/102, 103, 258, 259, 345, 347, 353, 356

(56) References Cited

U.S. PATENT DOCUMENTS 2,573,141 * 10/1951 Heinrich .............................. 425/89
2,886,849 * 5/1959 Brierley .............................. 425/812
5,603,880 * 2/1997 Kato et al. .............................. 264/112
5,672,364 * 9/1997 Kato et al. .............................. 425/89
6,074,586 * 6/2000 Brierley .............................. 425/89

* cited by examiner

*Primary Examiner*—Jan H. Silbaugh
*Assistant Examiner*—Kenneth M. Jones
(74) *Attorney, Agent, or Firm*—Harness, Dickey & Pierce P.L.C.

(57) ABSTRACT

A method and an apparatus for manufacturing tablets of moist powder which is produced by adding an additive agent such as an excipient or a binder to medical ingredients, further adding a solvent such as water, ethanol or the like, and kneading the mixture. The tablet manufacturing method comprises the steps of: preparing a first table and a second table which are intermittently rotated and driven relatively with respect to each other; supplying moist powder from a hopper into filling holes of the first table; filling the supplied moist powder into mold cavities of the second table under a pressurized condition by means of filling pins of a filling and pressurizing device at a location where the first table overlaps with the second table; relatively moving the first and second tables with respect to each other so as to level the surface of the moist powder in the mold cavities by removing the excessive powder; chamfering the surface of the moist powder by a finish-forming device; drying the moist powder by a dryer; and releasing the moist powder out of the mold cavities by a release device.

13 Claims, 10 Drawing Sheets

APPARATUS FOR MANUFACTURING TABLETS

This is a division of U.S. patent application Ser. No. 08/833,244, filed Apr. 17, 1997 U.S. Pat. No. 6,074,586, which was a division of U.S. patent application Ser. No. 08/494,924, filed Jun. 26, 1995, U.S. Pat. No. 5,672,364, issued Sep. 30, 1997.

BACKGROUND OF THE INVENTION

The present invention relates to a method and an apparatus for manufacturing tablets of moist powder.

Conventionally, tablets are classified into molded tablets and compressed tablets. These two kinds of tablets have been manufactured by different methods. The molded tablets are manufactured by kneading an additive agent such as an excipient or a binder into medical ingredients to form a mixture, adding a solvent such as water, ethanol or the like into the mixture to produce moist powder, and forming the moist powder to have a predetermined shape by molding. There are two methods of forming the moist powder into the tablets, one of which is a thrust-filling method in which the moist powder is forcibly pressed into a die having a certain shape, and the other of which is a die-punching method in which the moist powder is processed into a plate-like material by a rolling machine and a die of a certain shape is pressed against the material for punching. Since the molded tablets exhibit superior solubility and collapsibility when they are taken by a patient, they are manufactured as perlingual tablets and the like.

As an apparatus for manufacturing such molded tablets, an automatic tablet-manufacturing machine produced by Vector Colton in France has been known. This machine produces tablets by filling moist powder into mold cavities formed in a rotary disk, levelling the moist powder to smooth the surface, and pressing and releasing the moist powder out of the mold cavities onto a belt conveyer by ejector pins when they are located concentrically with the mold cavities.

However, tablets produced by the conventional molded tablet manufacturing machine have the same shape as the mold cavities which have a cylindrical shape or a shape with flat upper and lower surfaces. The cross-sectional shape of such tablets is a rectangle whose corners have a right angle, which results in a problem that the corners chip or are abraded in a packaging step or the like of the manufacturing process. Further, in the conventional molded tablet manufacturing machine, the moist powder tends to stick to the rolling device or the ejector pins so that there occurs dispersion in weight of tablets to be products, or the surface of the tablet becomes rough. Thus, the molded tablets are disadvantageous in respect of efficiency of production, accuracy and quality. Similarly, such sticking of the moist powder results in another problem that split lines, product marks or the like can not be stamped on the tablets.

Meanwhile, almost all the tablets now available in the market belong to the compressed tablets. An apparatus for manufacturing the compressed tablets molds dry granules at a relatively high pressure of 100 to several thousands kg/cm$^2$. This machine is generally called a tablet machine. The tablet machine comprises an upper rod, a lower rod and a mill. By applying force from the upper and lower rods to the granules supplied in the mill, the granules are pressurized and instantaneously formed into a tablet. A rotary-type tablet machine ordinarily includes 10 to 100 sets of an upper rod, a lower rod and a mill which are attached to a turn table.

By using the rotary-type tablet machine, it is possible to manufacture tablets of the same number as that of the sets of the upper and lower rods and the mill during one rotation of the turn table. There is a tablet machine having a maximum tablet manufacturing capacity of 8,000 per one minute. The compressed tablets are appropriate for mass production, and superior to the molded tablets in respect of accuracy and quality. However, since the dry granules are compressed at the high pressure, the compressed tablets are inferior to the molded tablets as for the solubility and collapsibility.

As mentioned above, although the compressed tablets are superior to the molded tablets in view of efficiency of production, the molded tablets having the excellent solubility and collapsibility are suitable for persons of advanced age and infants to take, who are low in organic and physiological function. Accordingly, by developing a method of effectively mass-producing tablets of high mechanical strength, accuracy and quality which are easy for the persons of advanced age and infants to take, without deteriorating the aforesaid characteristics of the molded tablets, a remarkable merit can be realized in the field of medicines.

SUMMARY OF THE INVENTION

The present invention aims to solve the above-described problems of the prior art, and it is an object of the invention to provide a method and an apparatus for efficiently manufacturing tablets of moist powder which are high in accuracy and quality.

It is another object of the invention to provide a method and an apparatus for efficiently manufacturing tablets of high accuracy and quality which are easy for persons of advanced age and infants to take, by solving the problem of sticking of moist powder.

To achieve the above object, according to the invention, a first table including a plurality of filling holes and a second table including a plurality of mold cavities are prepared, and the second table partially contacts with the first table and relatively moves with respect to the first table. A predetermined amount of moist powder is supplied in the filling holes of the first table. The moist powder supplied in the filling holes is filled into the mold cavities of the second table under a pressurized condition by means of filling pins at a location where the filling holes of the first table are laid above the mold cavities of the second table. Then, the first and second tables are moved relatively with respect to each other so as to level the surface of the moist powder in the mold cavities by removing the excessive powder, prior to finishing tablets.

Accordingly, since the surface of the moist powder is leveled after it has been pressurized, it is easy to deal with the moist powder so that productivity is improved, a ratio of void defect of a tablet is lowered, and dispersion of weight and size of the tablet is minimized. It is thus possible to manufacture tablets of high precision and quality, which tablets are high in mechanical strength and superior in solubility and collapsibility.

Moreover, according to the invention, moist powder is filled in molding cavities, and at least one of the surfaces of the moist powder in each of the molding cavities is pressed by a molding die through a powder-intercepting film so as to form the moist powder into the shape of a tablet.

Therefore, the powder-intercepting film is interposed between the moist powder in the molding cavities and the molding dies, to thereby prevent the moist powder from sticking to the molding dies, which enables chamfering of the corners of the tablets and stamping of product marks and the like on the surfaces of the tablets. Thus, there can be achieved a method and an apparatus for efficiently manufacturing tablets of high accuracy and quality which are easy for persons of advanced age and infants to take.

DETAILED DESCRIPTION OF THE INVENTION

Figure 1:
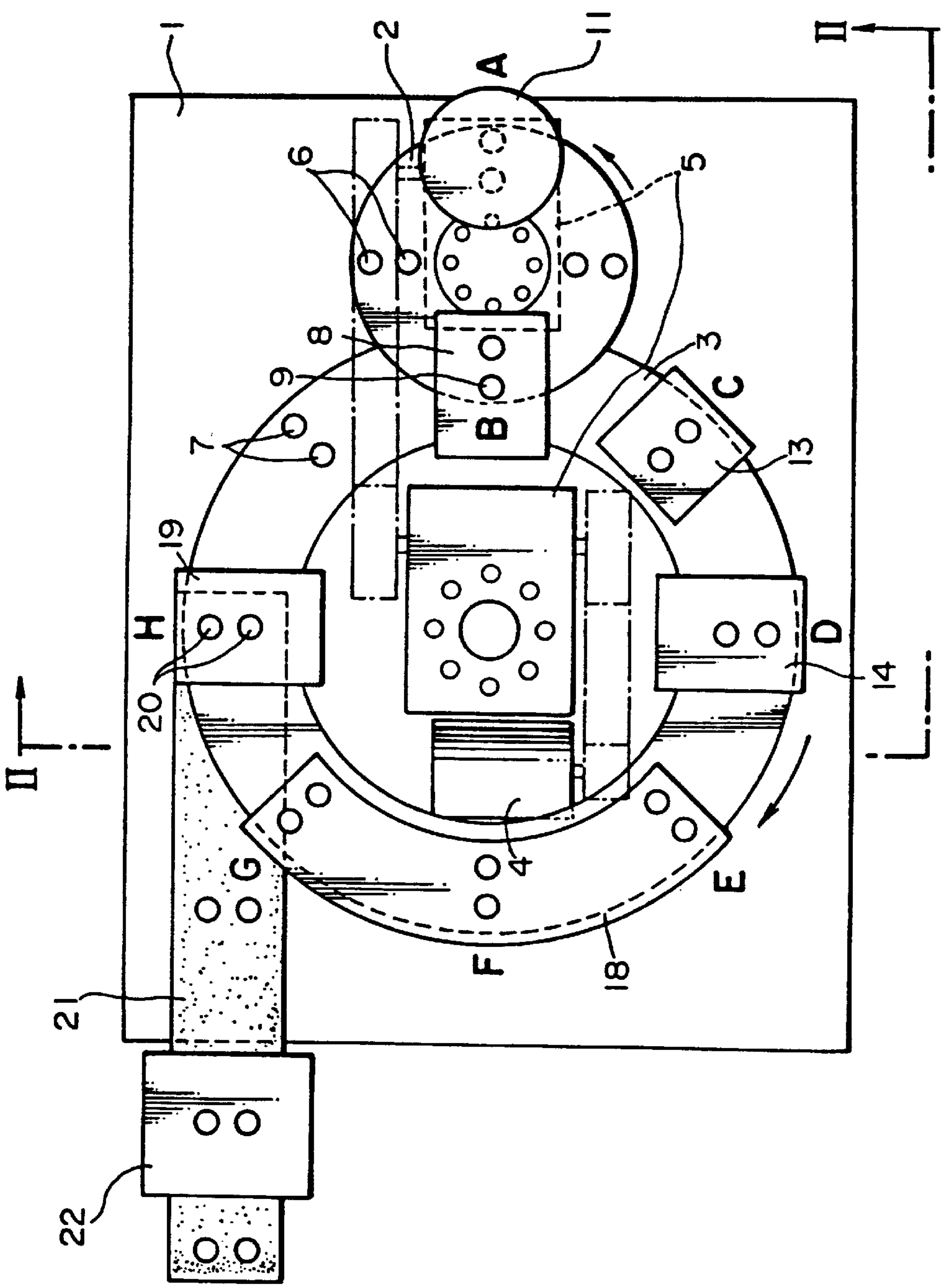
FIG. 1 is a schematic plan view showing a tablet manufacturing apparatus according to a first embodiment of the invention.
Figure 2:
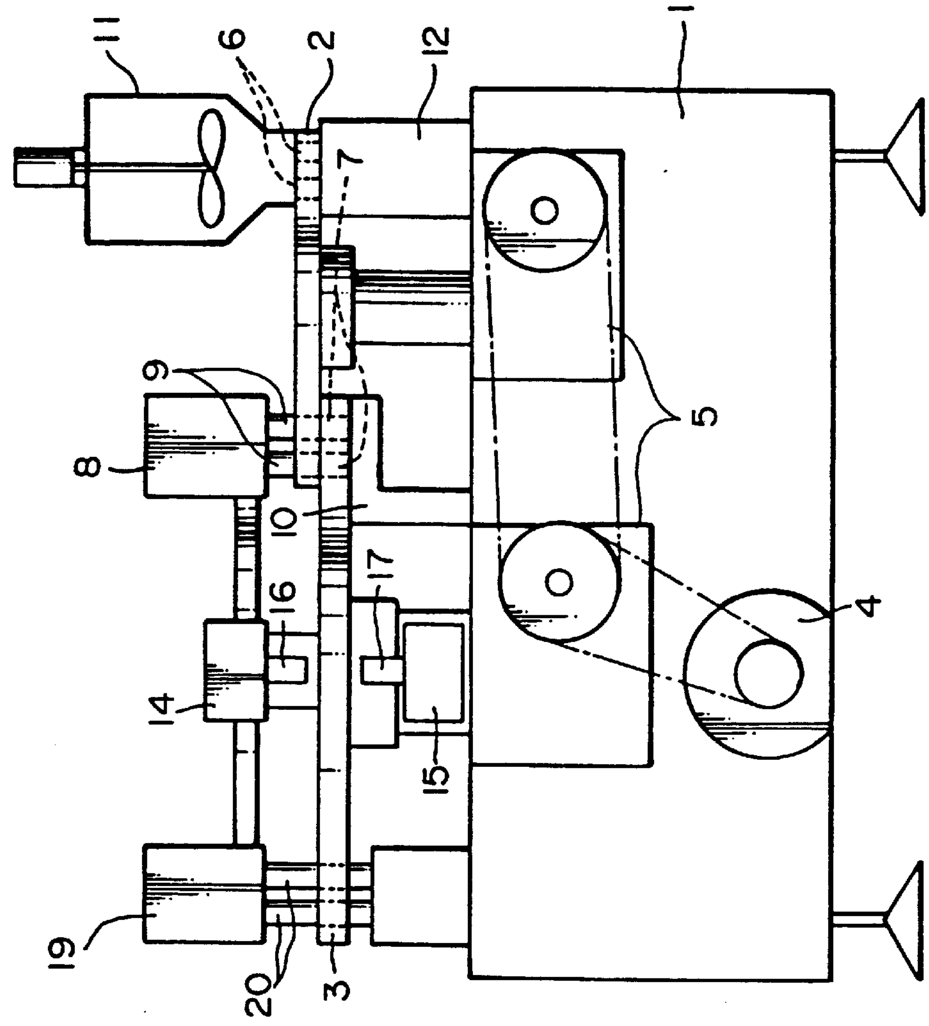
FIG. 2 is a schematic front elevation of the tablet manufacturing apparatus, as viewed in a direction indicated by the arrows II—II of FIG. 1.

The preferred embodiments of the present invention will be hereinafter described with reference to the attached drawings. FIG. 1 is a schematic plan view showing a tablet manufacturing apparatus according to a first embodiment of the invention, and FIG. 2 is a schematic front elevation of the apparatus, as viewed in a direction indicated by the arrows II—II of FIG. 1. On a bed 1, a small-diameter first table 2 and a large-diameter second table 3 are provided horizontally rotatably in such a manner that the first table partially contacts with and is laid on the second table at a station B. The first table 2 and the second table 3 are intermittently rotated by a drive unit including a motor 4 and two intermittent index-driving devices 5 which are connected to the motor 4 through chains. Two filling holes 6 are formed in the first table 2 at each of four positions which are equally spaced in the circumferential direction, and two mold cavities 7 are formed in the second table 3 at each of eight positions which are equally spaced in the circumferential direction. The filling holes 6 and the mold cavities 7 have the same diameter. The first table 2 and the second table 3 are positioned and driven by certain rotational angles by means of the intermittent index-driving devices 5, so that the mold cavities 7 are located right under the filling holes 6 at the station B.

At the station B where the filling holes 6 and the mold cavities 7 are concentrically positioned, a filling and pressurizing device 8 is provided above the first table 2. Filling pins 9 which have a diameter slightly smaller than that of the filling holes 6 and the mold cavities 7 are attached to a lower portion of the filling and pressurizing device 8. A filling receiver 10 is provided under the second table 3 at a position opposite to the filling pins 9.

At a station A of the first table 2 at 180 degrees from the station B, a hopper 11 is installed above the first table 2. At a position opposite to the hopper 11, a hopper receiver 12 is provided under the first table 2.

At a station C rotated clockwise for 45 degrees from the station B of the second table 3, a releasing agent coating device 13 is provided on the upper and lower sides of the second table 3.

At a station D further rotated for 45 degrees from the station C of the second table 3, an upper finish-forming device 14 and a lower finish-forming device 15 are provided on the upper and lower sides of the second table 3. Upper rods 16 are attached to the upper finish-forming device 14 while lower rods 17 are attached to the lower finish-forming device 15.

Over stations E, F and G rotated clockwise for 45, 90 and 135 degrees from the station D of the second table 3, a dryer 18 is provided above the second table 3.

At a station H further rotated clockwise for 45 degrees from the station G of the second table 3, a release device 19 is provided above the second table 3, and ejector pins 20 are attached to a lower portion of the release device 19. One end of a conveyer 21 is located under the second table 3 at the station H whereas the other end of the conveyer 21 extends over a side edge of the bed 1, with a dryer 20 being installed on an intermediate portion of the conveyer 21.

The first table 2 and the second table 3 are intermittently rotated by 90 degrees and by 45 degrees, respectively, by the intermittent index-driving devices 5, so that the second table 3 is rotated once while the first table 2 is rotated twice, and that the filling holes 6 and the mold cavities 7 reliably pause at each station.

Figure 3A:
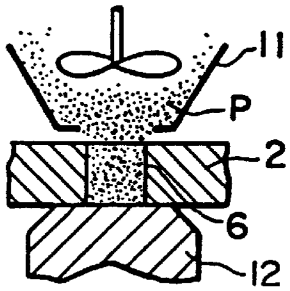
FIGS. 3A to 3G are schematic views showing steps of a tablet manufacturing method according to the first embodiment.

An operation of the above-described embodiment will now be described with reference to FIG. 3. First, at the station A, as shown in FIG. 3A, moist powder P contained in the hopper 11 is supplied and filled in the filling holes 6 of the first table 2. Because the hopper receiver 12 is provided under the filling holes 6, the moist powder P is surely supplied in the filling holes 6. At this time, the moist powder P is excessively supplied and heaped in the filling holes 6. In actual practice, an upper portion of each filling hole 6 is shaped like a mortar, or the first table 2 is formed to have a larger thickness than the second table 3, or those portions of the first table 2 which surround the filling holes 6 are only increased in thickness, so that the moist powder P of an amount sufficiently larger than the volume of the mold cavities 7 of the second table 3 can be supplied. After the moist powder P has been supplied in the filling holes 6, the filling holes 6 are moved to the station B by two strokes, and then, another set of filling holes 6 are located under the hopper 11.

The moist powder P to be used is mixture powder consisting of about 0.0004 to 80 weight % of medical effective ingredients, about 10 to 80 weight % of at least one or more kinds of an excipient, a collapse agent, a binder, an acidity agent, a foaming agent, a perfume, a smoothing agent, a colorant, and an additive agent such as a sweetening agent, and about 1 to 25 weight % of, preferably about 6 to 20 weight % of a wetting agent. As the wetting agent, there can be used a solvent such as water, ethanol, propanol, isopropanol or the like which is approved from the viewpoint of medicine manufacture. Alternatively, a mixture of these solvents or an organic solvent such as hexane which is insoluble with respect to water can be used.

Figure 3B:
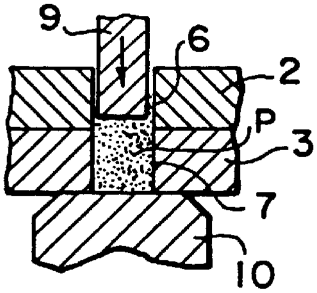

At the station B, as shown in FIG. 3B, the filling holes 6, in which the moist powder P has been supplied, are located above the mold cavities 7 of the second table 3, with the lower opening ends of the mold cavities 7 being closed by the filling receiver 10. Then, the filling pins 9 of the filling and pressurizing device 8 are lowered to pressurize the moist powder P in the filling holes 6 under a predetermined pressure and feed the moist powder P into the mold cavities 7 of the second table 3. The pressure applied to the moist. powder P at this time is ordinarily about 5 to 80 Kg/cm$^2$, preferably about 5 to 60 Kg/cm$^2$, and more preferably about 5 to 40 Kg/cm$^2$. Since the moist powder P is excessively supplied in the filling holes 6 in the previous step, the moist powder P slightly remains in the filling holes 6 even after the mold cavities 7 have been filled.

Figure 3C:
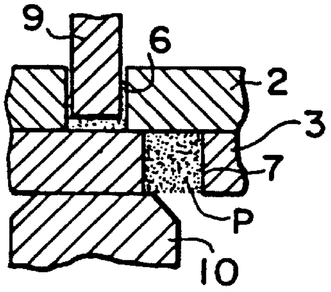

Subsequently, as shown in FIG. 3C, when the second table 3 is rotated toward the station C, the mold cavities 7 filled with the moist powder P and the filling holes 6 are relatively moved while in contact with each other, the moist powder P in the mold cavities 7 is leveled by removing the excessive powder by edges of the filling holes and of the mold cavities. Thus, bases of tablets can be formed in the mold cavities 7.

Figure 3D:
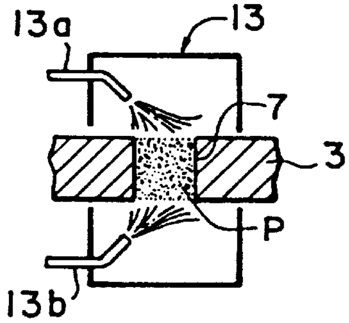
Figure 3E:
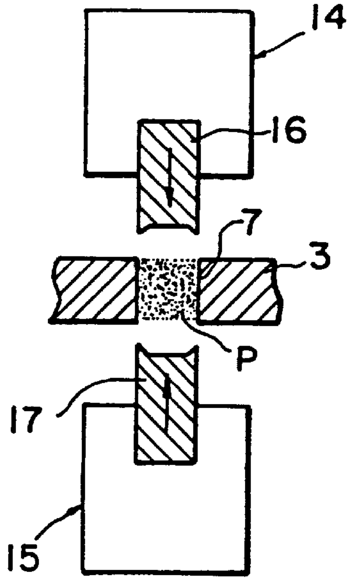

At the station C, as shown in FIG. 3D, a releasing agent (an anti-adhesion material also called a smoothing agent) is applied to the moist powder P filled in the mold cavities 7 of the second table 3, from nozzles 13*a*, 13*b* of the releasing agent coating device 13 on the upper and lower sides of the moist powder P. Application of such a releasing agent is performed to prevent the moist powder P from sticking to the upper and lower rods which directly contact with the moist powder P when they are used for chamfering in the following step. The moist powder P which is adhesive owing to its particular viscosity and moisture, sticks to the rods and deforms tablets or solidifies fixedly on the rods, thereby causing troubles in the manufacture of tablets.

It is required to use a releasing agent harmless to a human body because the releasing agent is directly applied to the moist powder P to be manufactured into a tablet. As such releasing agent, there are, for example, stearic acid, calcium stearate, magnesium stearate, talc, cellulose saccharides, starch or the like such as corn starch, silicic anhydride, and a substance used as a smoothening agent for medicine such as silicone oil. However, the releasing agent is not necessarily restricted to the above-described substances. In particular, it is desirable to use stearic acid, calcium stearate, magnesium stearate, and starch or the like such as corn starch and potato starch. Needless to say, it is possible to mix these substances before use.

At the station D, as illustrated in 3E, the moist powder P in the mold cavities 7, which has been applied with the releasing agent on both the surfaces, is pressed by the upper rods 16 of the upper finish-forming device 14 and the lower rods 17 of the lower finish-forming device 15, so as to chamfer the upper and lower surfaces of the moist powder P along the recessed end faces of the upper and lower rods 16, 17. The moist powder P is prevented from sticking to these upper and lower rods 16, 17 because the moist powder P is applied with the releasing agent. Incidentally, the chamfering is performed to round off the corners of the tablet, for making it easy for a person to swallow the tablet. In this specification, the term “chamfering” means not only processing of the surface of the tablet into a planar surface but also processing of it into a spherical surface. If the chamfering is not performed, application of the releasing agent in the previous step is not required. At the time of chamfering, a split line or product mark may be stamped on the surface of the tablet.

Figure 3F:
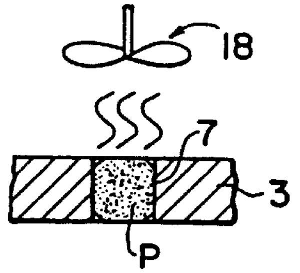

Next, at the stations E, F and G, as shown in FIG. 3F, the moist powder P which has been finish-formed in the mold cavities 7 is dried by the dryer 18 and solidified to be produced as tablets.

Figure 3G:
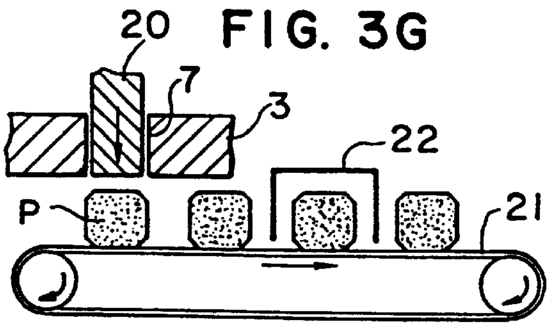

At the station H shown in FIG. 3G, the tablets of moist powder P which have been solidified in the mold cavities 7 are pressed down and released out of the cavities by the ejector pins 20 of the release device 19, and are dropped onto a belt of the rotating conveyer 21. The dropped tablets of moist powder P are further dried by the dryer 22 and thereafter discharged into a predetermined tray. The step for application of a smoothing agent may also be provided before the discharge step.

According to the above-described embodiment, the moist powder P supplied in the filling holes 6 of the first table 2, is filled into the mold cavities 7 of the second table 3 by pressing the filling pins 9. Then, the first and second tables 2 and 3 are relatively moved with respect to each other so as to level the surface of the moist powder P in the mold cavities 7 by removing the excessive powder, thus forming it into tablets. Therefore, tablets can be easily manufactured, enabling mass-production of tablets. Further, a ratio of void defect of a tablet is lowered, and dispersion of weight and size of the tablets are minimized, and also, their mechanical strength is enhanced. Thus, it is possible to manufacture tablets which are high in precision and quality.

Figure 4:
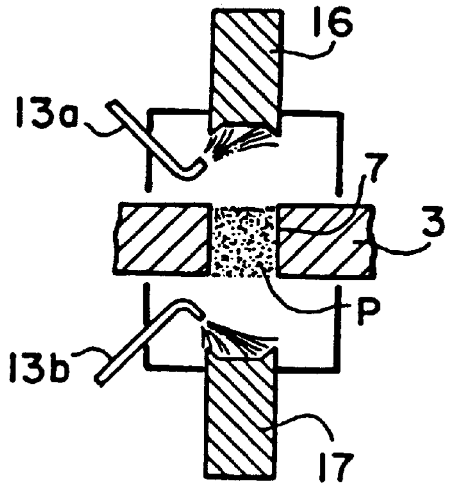
FIG. 4 is a schematic view showing an essential portion of a modification of the first embodiment.

In this embodiment, the releasing agent is directly applied to the moist powder P in the step of FIG. 3D prior to chamfering. Instead, the releasing agent coating device 13 may be installed at the station D, and as shown in FIG. 4, the releasing agent may be applied to those end faces of the upper and lower rods 16, 17 which contact with the moist powder P, before the chamfering step of FIG. 3E.

Figure 5:
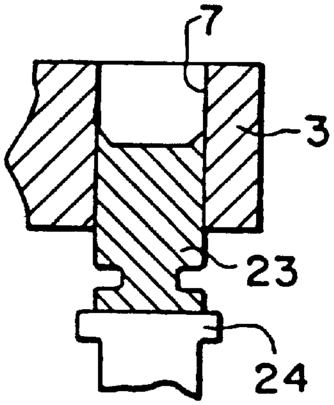
FIG. 5 is a schematic view showing an essential portion of another modification of the first embodiment.

Moreover, as shown in FIG. 5, the lower end opening of each mold cavity 7 of the second table 3 may be closed by a slide pin 23 having an upper surface recessed for chamfering, and the slide pin 23 may be designed to move vertically by a rail 24. As a result, the filling receiver 10, the hopper receiver 12, the lower rods 17, the ejector pins 20 and so forth are not required. In this case, however, the releasing agent must be applied to the upper end faces of the slide pins 23 in advance. Also, after tablets are pressed and released out of the cavities by raising the slide pins 23, the tablets can be moved onto the conveyer 21 by additional means such as a gripper.

Figure 6:
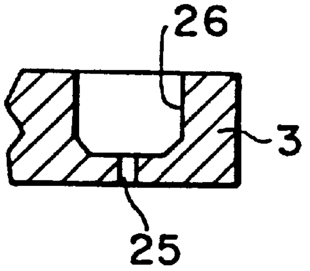
FIG. 6 is a schematic view showing an essential portion of a still other modification of the first embodiment.

Furthermore, as shown in FIG. 6, in place of the mold cavities 7 of the second table 3, there may be provided mold cavities 26 which are closed at the bottom to form air holes 25 and which are chamfered at the corners of the bottom. Consequently, in the same manner as described above, the filling receiver 10, the hopper receiver 12, the lower rods 17, the ejector pins 20 and so forth are not required. In this case, the air is supplied to the air holes 25 to release tablets out of the cavities. However, the released products include the moist powder remaining in portions corresponding to the air holes 25, so that these residual portions must be removed.

As has been described above, according to the first embodiment, the first and second tables which partially contact with each other and are relatively moved to each other are used, and the moist powder supplied in the filling holes of the first table is pressurizingly filled in the mold cavities of the second table by the filling pins at the location where the filling holes of the first table are laid above the mold cavities of the second table, and then, the surface of the filled moist powder is leveled by removing the excessive powder by relatively moving the first and second tables to each other, thus forming the moist powder into tablets. Accordingly, it is easy to deal with the moist powder so that the productivity is improved, a ratio of void defect of a tablet is lowered, and dispersion of weight and size of the tablets is minimized. Thus, it is possible to manufacture tablets of high precision and quality which are high in mechanical strength and superior in solubility and collapsibility.

Figure 7:
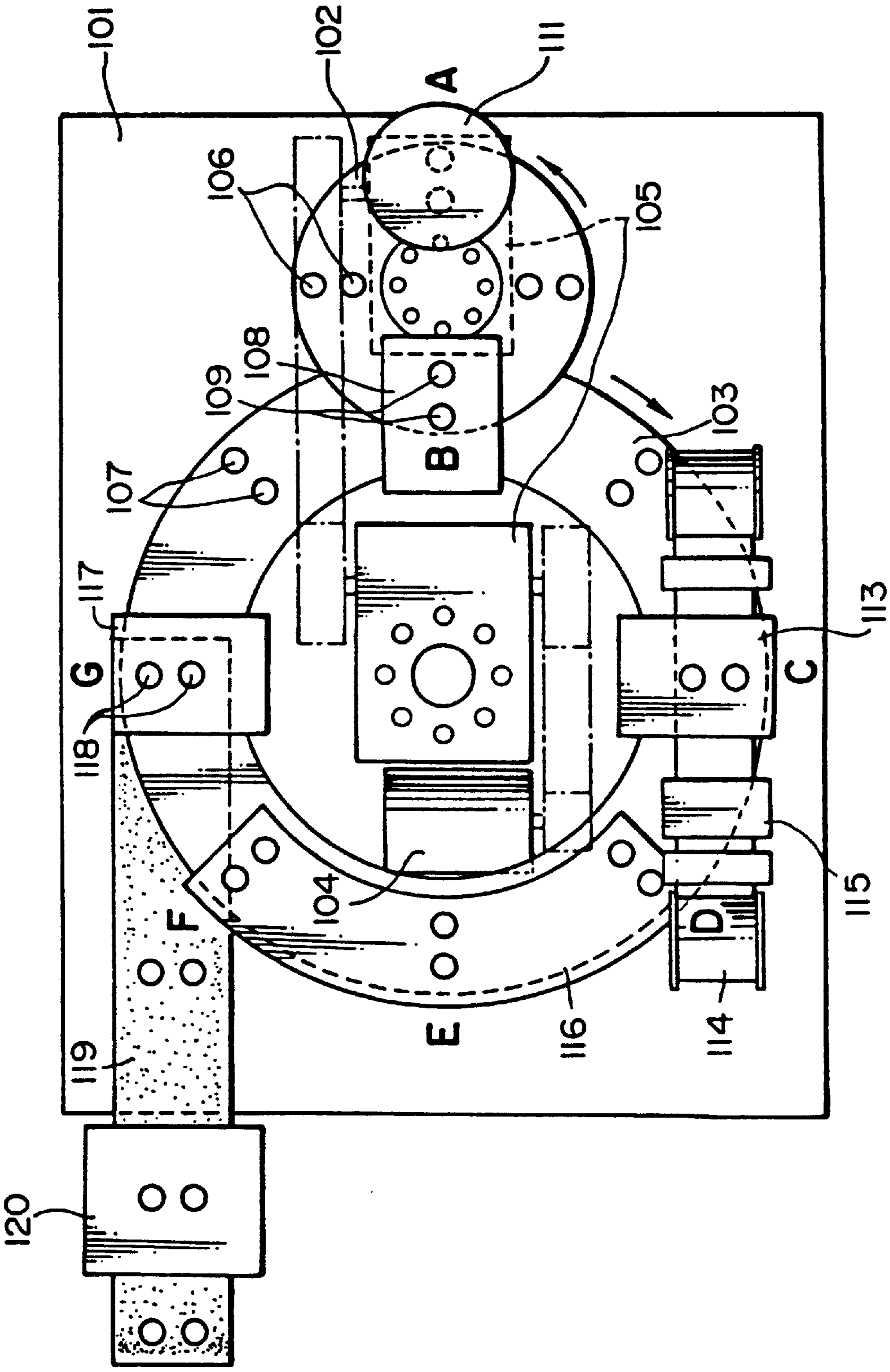
FIG. 7 is a schematic plan view showing a tablet manufacturing apparatus according to a second embodiment of the invention.
Figure 8:
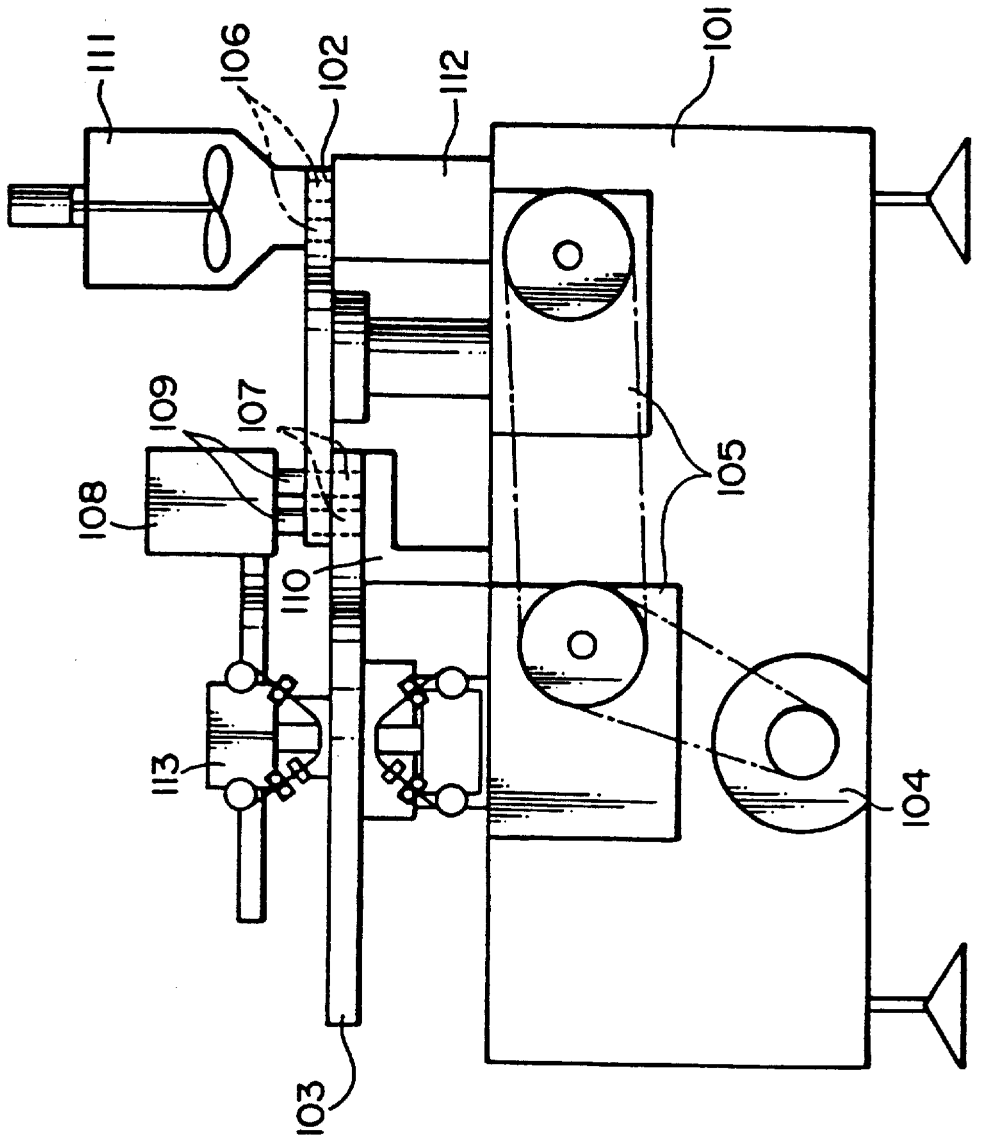
FIG. 8 is a schematic front elevation of the tablet manufacturing apparatus;.

FIG. 7 is a schematic plan view showing a tablet manufacturing apparatus according to a second embodiment of the present invention, and FIG. 8 is a schematic front elevation of the apparatus. On a bed 101, a small-diameter first table 102 and a large-diameter second table 103 are provided horizontally rotatably in such a manner that the first table 102 partially contacts with and is laid on the second table 103 at a station B. The first table 102 and the second table 103 are intermittently rotated by a drive unit including a motor 104 and two intermittent index-driving devices 105 which are connected to the motor 104 through chains. Two filling holes 106 are formed in the first table 102 at each of four positions which are equally spaced in the circumferential direction, and two mold cavities 107 for finish-forming are formed in the second table 103 at each of eight positions which are equally spaced in the circumferential direction. The filling holes 106 and the mold cavities 107 have the same diameter. The first table 102 and the second table 103 are positioned and driven by certain rotational angles by the intermittent index-driving devices 105, so that the mold cavities 107 are located right under the filling holes 106 at the station B.

At the station B where the filling holes 106 and the mold cavities 107 are concentrically positioned, a filling and pressurizing device 108 is provided above the first table 102. Filling pins 109 which have a diameter slightly smaller than that of the filling holes 106 and the mold cavities 107 are attached to a lower portion of the filling and pressurizing device 108. A filling receiver 110 is provided under the second table 103 at a position opposite to the filling pins 109.

At a station A of the first table 102 at 180 degrees from the station B, a hopper 111 is installed above the first table 102. At a position opposite to the hopper 111, a hopper receiver 112 is provided under the first table 102.

At a station C rotated clockwise for 90 degrees from the station B of the second table 103, a finish-forming device 113 is provided on the upper and lower sides of the second table 103. Powder-intercepting film feeders 114 and releasing agent coating devices 115 are attached to the finish-forming device 113, as will be described later.

Over stations D, E and F rotated clockwise for 45, 90 and 135 degrees from the station C of the second table 103, a dryer 116 is provided above the second table 103.

At a station G further rotated clockwise for 45 degrees from the station F of the second table 103, a release device 117 is provided above the second table 103, and ejector pins 118 are attached to a lower portion of the release device 117. One end of a conveyer 119 is located under the second table 103 at the station G whereas the other end of the conveyer 119 extends over a side edge of the bed 101, with a dryer 120 being installed on an intermediate portion of the conveyer 119.

The first table 102 and the second table 103 are intermittently rotated by 90 degrees and by 45 degrees, respectively, by the intermittent index-driving devices 105, so that the second table 103 is rotated once while the first table 102 is rotated twice, and that the filling holes 106 and the mold cavities 107 reliably pause at each station.

Figure 9:
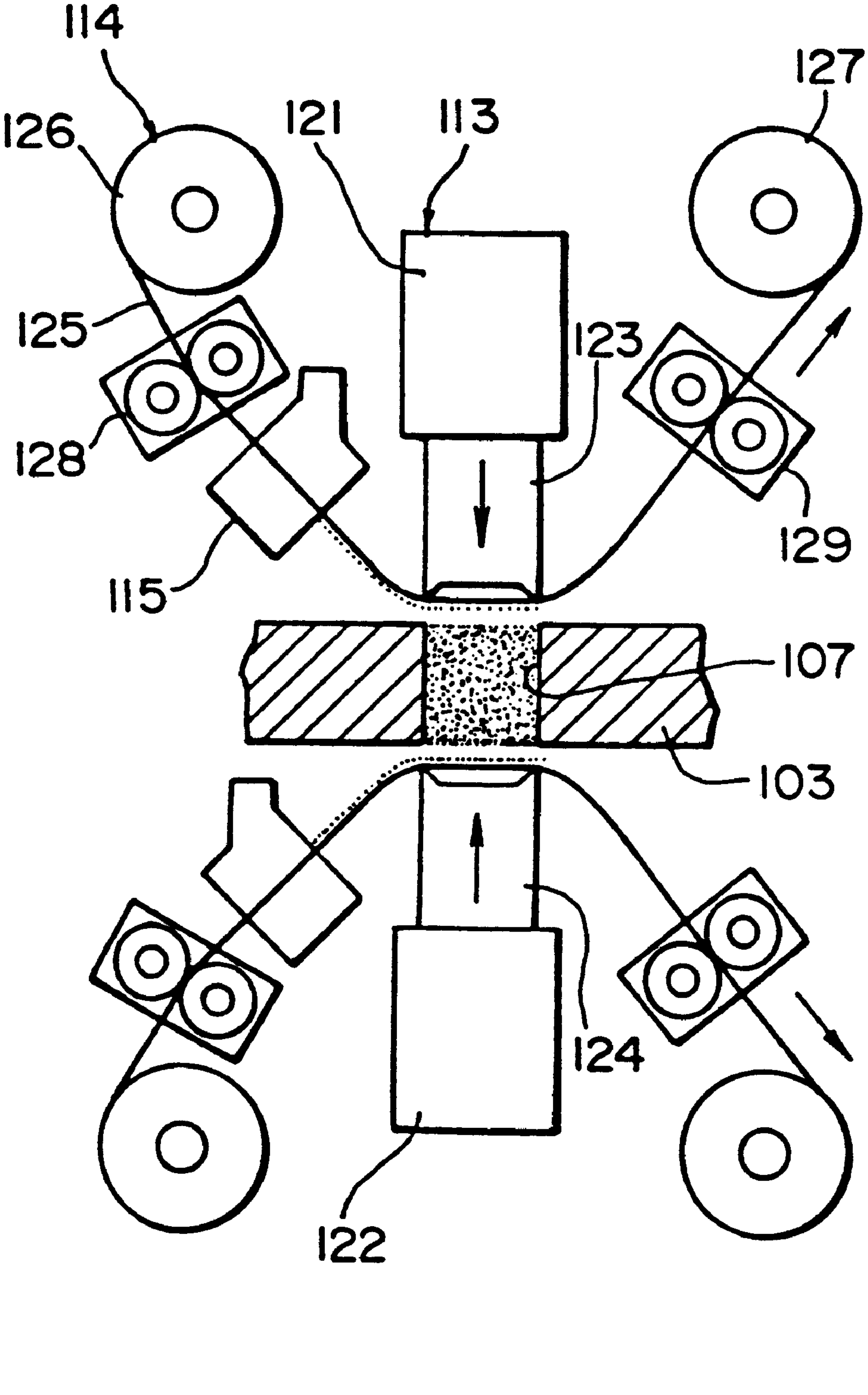
FIG. 9 is a schematic front elevation showing a finish-forming device and neighboring devices in the second embodiment.

FIG. 9 illustrates the positional relationship of the finish-forming device 113 with the powder-intercepting film feeders 114 and the releasing agent coating devices 115 which are attached to the finish-forming device 113. The finish-forming device 113 comprises upper finish-forming means 121 and lower finish-forming means 122 of the same structure which are provided on the upper and lower sides of the second table 103, and respectively include upper rods 123 and lower rods 124 which serve as molding dies. The upper rods 123 and the lower rods 124 have end faces recessed for chamfering. The powder-intercepting film feeders 114 are provided on the upper and lower sides of the second table 103, and the upper and lower feeders have the same structure. Each of the feeders 114 comprises a feeding reel 126 around which a powder-intercepting film 125 made of resin or rubber in the form of tape is wound, for supplying the film, the feeding reel 126 being located on one side of the associated finish-forming means 121, 122, a take-up reel 127 for taking up the powder-intercepting film 125 after use, which take-up reel is located on the other side of the finish-forming means, and tension means 128 and 129 for applying tensile force to the powder-intercepting film 125, which are provided on both sides of the finish-forming means 121, 122. The releasing agent coating devices 115 are located between the tension means 128 close to the feeding reels 126 and the finish-forming means 121, 122, whereby a releasing agent (an anti-adhesion material also called a smoothing agent) is applied to the surface of the powder-intercepting film 125 which faces the second table 103. The releasing agent coating devices 115 are provided for preventing moist powder from sticking to the powder-intercepting films 125, and are not required when the powder-intercepting films 125 are made of a material having excellent anti-adhesion property, such as polytetrafluoroethylene. Also, the coating devices 115 are not provided when mixing of the releasing agent with tablets must be avoided.

Preferably, the powder-intercepting film 125 is a film which is soft and hard to cut, prevents moist powder from sticking to the film during finish-forming, and does not influence stability of medicine or such factors so that the film can be used for packaging medicine. For example, there is employed a film of nylon, polytetrafluoroethylene, polyester, polypropylene, polyethylene, polycarbonate or the like. The thickness of the film is, preferably, 10 to 30 $\mu$m.

Figure 10A:
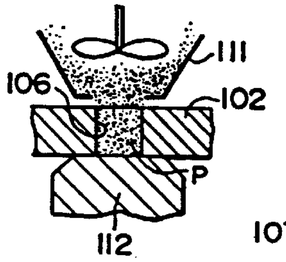
FIGS. 10A to 10J are schematic views showing steps of a tablet manufacturing method according to the second embodiment.

An operation of the above-described embodiment will now be described with reference to FIG. 10. First, at the station A, as shown in FIG. 10A, moist powder P contained in the hopper 111 is supplied and filled in the filling holes 106 of the first table 102. Because the hopper receiver 112 is provided under the filling holes 106, the moist powder P is surely supplied in the filling holes 106. At this time, the moist powder P is excessively supplied and heaped in the filling holes 106. In actual practice, an upper portion of each filling hole 106 is shaped like a mortar, or the first table 102 is formed to have a larger thickness than the second table 103, or those portions of the first table 102 which surround the filling holes 106 are only increased in thickness, so that the moist powder P of an amount sufficiently larger than the volume of the mold cavities 107 of the second table 103 can be supplied. After the moist powder P has been supplied in the filling holes 106, the filling holes 106 are moved to the station B by two strokes, and then, another set of filling holes 106 are located under the hopper 111.

The moist powder P to be used is mixture powder consisting of about 0.0004 to 80 weight % of medical effective ingredients, about 10 to 80 weight % of at least one or more kinds of an excipient, a collapse agent, a binder, an acidity agent, a foaming agent, a perfume, a smoothing agent, a colorant, and an additive agent such as a sweetening agent, and about 1 to 25 weight % of, preferably about 6 to 20 weight % of a wetting agent. As the wetting agent, there can be used a solvent such as water, ethanol, propanol, isopropanol or the like which is approved from the viewpoint of medicine manufacture. Alternatively, a mixture of these solvents or an organic solvent such as hexane which is insoluble with respect to water can be used.

Figure 10B:
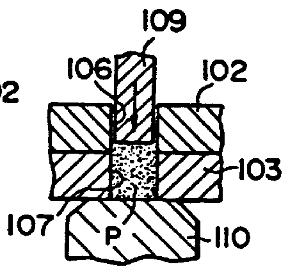

At the station B, as shown in FIG. 10B, the filling holes 106, in which the moist powder P has been supplied, are located above the mold cavities 107 of the second table 103, with the lower opening ends of the mold cavities 107 being closed by the filling receiver 119. Then, the filling pins 109 of the filling and pressurizing device 108 are lowered to pressurize the moist powder P in the filling holes 106 under a predetermined pressure and feed the moist powder P into the mold cavities 107 of the second table 103. The pressure applied to the moist powder P at this time is ordinarily about 5 to 80 $Kg/cm^2$, preferably about 5 to 60 $Kg/cm^2$, and more preferably about 5 to 40 $Kg/cm^2$. Since the moist powder P is excessively supplied in the filling holes 106 in the previous step, the moist powder P slightly remains in the filling holes 106 even after the mold cavities 107 have been filled.

Figure 10C:
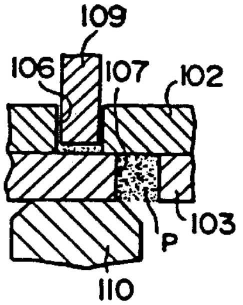

Subsequently, as shown in FIG. 10C, when the second table 103 is rotated toward the station C, the mold cavities 107 filled with the moist powder P and the filling holes 106 are relatively moved while in contact with each other, the moist powder P in the mold cavities 107 is leveled by removing the excessive powder by edges of the filling holes and of the mold cavities. Thus, bases of tablets can be formed in the mold cavities 107.

Figure 10D:
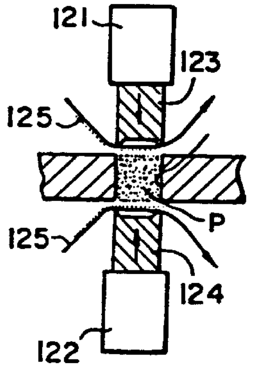

At the station C, as shown in FIG. 10D, the moist powder P in the mold cavities 107 is pressed by the upper rods 123 of the upper finish-forming means 1 and the lower rods 124 of the lower finish-forming mea 122 through the powder-intercepting films 125, so as t chamfer the upper and lower surfaces of the moist powd P along the shapes of the end faces of the upper and lower rods 123, 124 while preventing the moist powder from sticking to these upper and lower rods 123, 124. Incidentally, the chamfering is performed to round off the corners of the tablet, for preventing abrasion or chipping. In this specification, the term “chamfering” means not only processing of the surface of the tablet into a planar surface but also processing of it into a spherical surface.

Figures 11A, 11B, 11C, 11D, 11E:
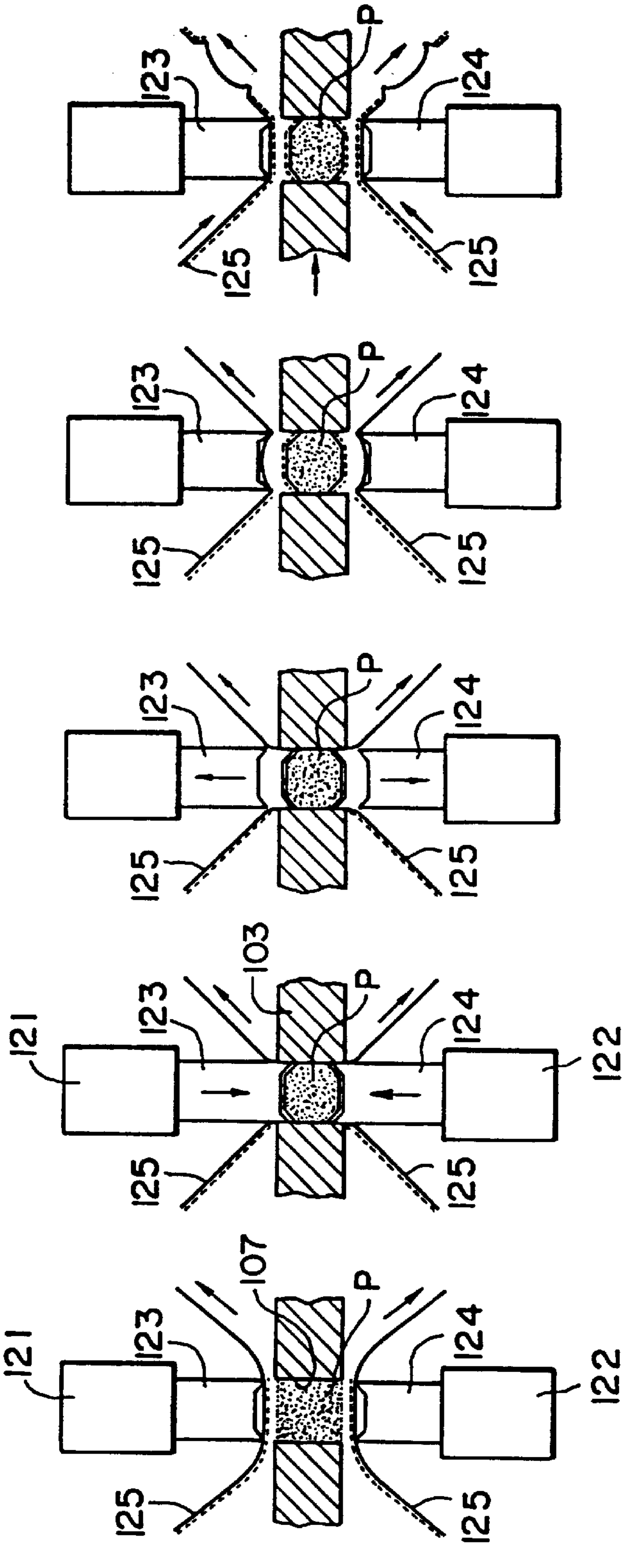
FIGS. 11A to 11E are schematic views showing finish-forming steps in the second embodiment.

This process will be described more specifically with reference to FIGS. 9 and 11. As shown in FIG. 11A, the powder-intercepting films 125 which have been applied with the releasing agent by the releasing agent coating devices 115 are applied with tensile force by the tension means 128, 129 which are located on both sides of the finish-forming means 121, 122, and the films 125 are lightly press-fitted to the end faces of the upper and lower rods 123, 124. Then, as shown in FIG. 11B, by the finish-forming means 121, 122, the upper and lower rods 123, 124 are moved toward each other so as to press, through the powder-intercepting films 125, the moist powder P in the mold cavities 107 of the second table 103 which has been shifted from the previous station. Next, as shown in FIG. 11C, when the upper and lower rods 123, 124 are moved away from each other, the powder-intercepting films 125 attach to the moist powder P for a moment owing to viscosity of the moist powder P. However, the powder-intercepting films 125 are immediately released from the moist powder P, as shown in FIG. 11D, because the powder-intercepting films 125 are constantly applied with tensile force by the tension means 128, 129. At this time, the releasing agent on the powder-intercepting films 125 is partially transferred to the moist powder P. Subsequently, as shown in FIG. 11E, the powder-intercepting films 125 are fed by a predetermined amount by the film feeders 114, so that unused surfaces of the films 125 which are coated with the releasing agent will be located on the upper and lower rods 123, 124.

In this embodiment, it is required to use a releasing agent harmless to a human body because the releasing agent is partially attached to the moist powder P to be manufactured into a tablet. As such releasing agent, there are, for example, stearic acid, calcium stearate, magnesium stearate, talc, cellulose saccharides, starch or the like such as corn starch, silicic anhydride, and a substance used as a smoothening agent for medicine such as silicone oil. However, the releasing agent is not necessarily restricted to the above-described substances. In particular, it is desirable to use stearic acid, calcium stearate, magnesium stearate, and starch or the like such as corn starch and potato starch. Needless to say, it is possible to mix these substances before use.

Figure 10E:
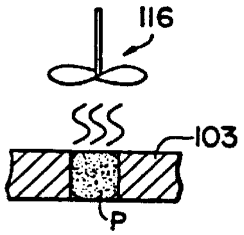

Next, referring back to FIG. 10, at the stations D, E and F, the moist powder P which has been finish-formed in the mold cavities 107 is dried by the dryer 116 and solidified to be produced as tablets, as shown in FIG. 10E.

Figure 10F:
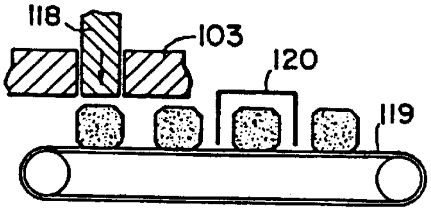

At the station G shown in FIG. 10F, the tablets of moist powder P which have been solidified in the mold cavities 107 are pressed down and released out of the cavities by the ejector pins 118 of the release device 117, and dropped onto a belt of the rotating conveyer 119. The dropped tablets of moist powder P are further dried by the dryer 120 and thereafter discharged into a predetermined tray.

According to the above-described embodiment, the moist powder P supplied in the filling holes 106 of the first table 102, is filled into the mold cavities 107 of the second table 103 by pressing the filling pins 109. Then, the first and second tables 102 and 103 are relatively moved with respect to each other so as to level the surface of the moist powder P in the mold cavities 107 by removing the excessive powder. After that, the finish-forming device 113 is operated to chamfer the surfaces of the moist powder P through the powder-intercepting films 125 by means of the upper and lower rods 123, 124. Therefore, tablets can be easily manufactured, enabling mass-production of tablets. Further, a ratio of void defect of a tablet is lowered, and dispersion of weight and size of the tablets is minimized, and also, their mechanical strength is enhanced. Thus, it is possible to manufacture tablets which are high in precision and quality.

Figure 12:
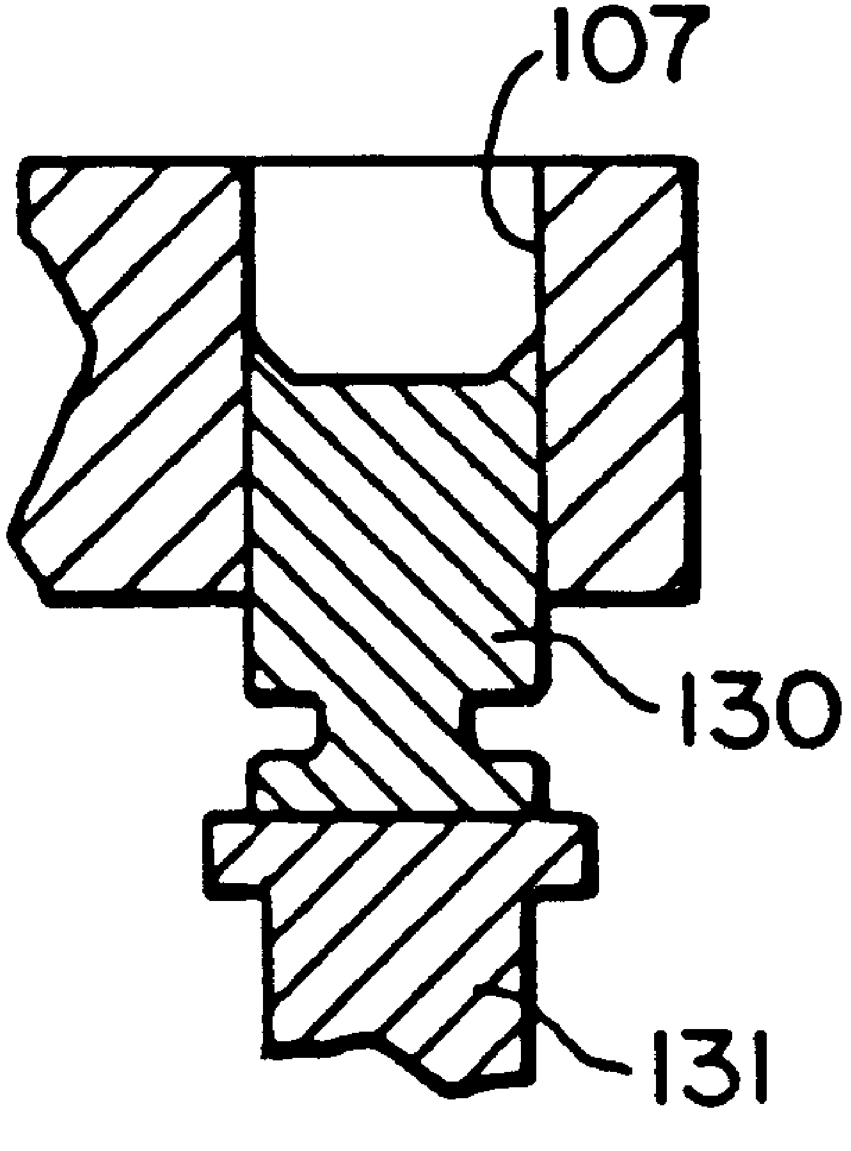
FIG. 12 is a schematic view showing an essential portion of a modification of the second embodiment.

In this embodiment, as shown in FIG. 12, the lower end opening of each mold cavity 107 of the second table 103 may be closed by a slide pin 130 having an upper surface which has been recessed for chamfering and applied with the releasing agent in advance, and the slide pin 130 may be designed to move vertically by a rail 131. As a result, the filling receiver 110, the hopper receiver 112, the lower rods 124, the lower powder-intercepting film 125 and the associated components, the ejector pins 118 and so forth are not required. In this case, after tablets are pressed and released out of the cavities by raising the slide pins 130, the tablets can be moved onto the conveyer 119 by additional means such as a gripper.

Moreover, in this embodiment, the surface of the moist powder P in the mold cavities 107 is leveled by relatively moving the first and second tables 102, 103 with respect to each other. However, the excessive powder may be removed by other leveling means such as a scraper. Furthermore, in the step before chamfering, the moist powder P is pressurized when it is moved from the filling holes 106 into the mold cavities 107. However, without such pressurization prior to chamfering, the moist powder P may be pressurized under a similar pressure only upon chamfering. At the time of chamfering, a split line or product mark may be stamped on the surface of the tablet.

A powder-intercepting film may be used for the release step shown in FIG. 10F. FIGS. 10G to 10J show such an embodiment. More specifically, in the embodiment of FIGS. 10G to 10J, a powder-intercepting film feeder 144 is attached to a release device. The powder-intercepting film feeder 144 comprises a feeding reel 143 around which a powder-intercepting film 140 is wound, a take-up reel 142 provided on the other side for taking up the powder-intercepting film 140 after use, and feeding means 141 for intermittently feeding the powder-intercepting film 140 from the feeding reel 143 to the take-up reel 142, the feeding means 141 being located adjacent to the take-up reel 142. With such a structure, the powder-intercepting film 140 is intermittently moved through a space between the release device and the second table 103. In this embodiment, an end face of each ejector pin 118*a* of the release device has a recessed shape corresponding to the chamfered shape of the moist powder P.

Figure 10G:
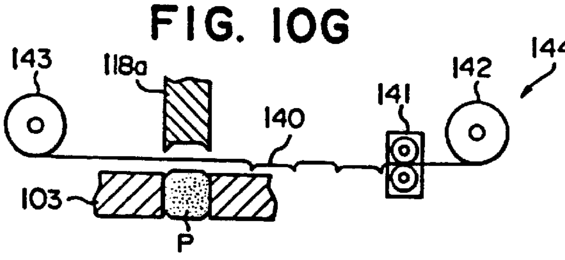
Figure 10H:
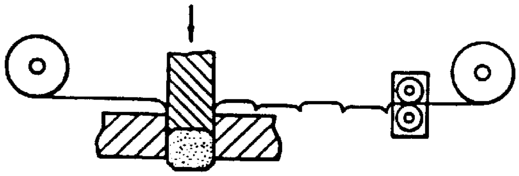
Figure 10I:
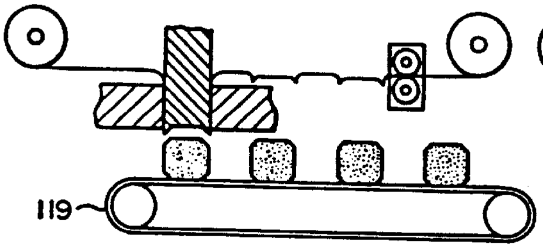
Figure 10J:
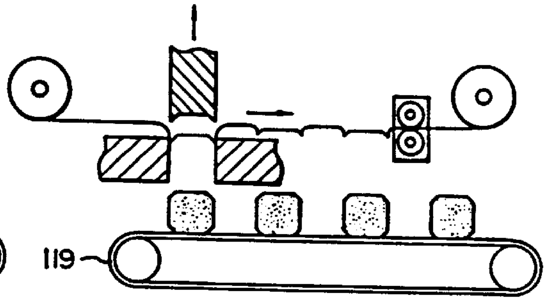

In this embodiment, tablets of moist powder P in the state shown in FIG. 10G are pressed and released out of the cavities by the ejector pins 118*a* through the powder-intercepting film 140, as shown in FIGS. 10H and 10I, and are dropped onto a belt of a rotating conveyer 119. During the operation of the ejector pins 118*a* shown in FIGS. 10G to 10I, the feeding means 141 are stopped. As the ejector pins 118*a* are moved from a position shown in FIG. 10G to a position shown in FIG. 10I, the powder-intercepting film 140 is withdrawn from the feeding reel 143 by an amount in accordance with an amount of the movement of the pins 118*a*. After the tablets of moist powder P have been dropped onto the belt of the conveyer 119, the ejector pins 118*a* are raised, as shown in FIG. 10J, and the feeding means 141 are synchronously operated so that the powder-intercepting film 140 after use is taken up by the take-up reel 142 by an amount corresponding to the used amount.

By employing the powder-intercepting film 140 in the above-described manner, the moist powder P can be reliably prevented from sticking to the ejector pins 118*a*. A material, a thickness and so forth of the powder-intercepting film 140 are the same as those of the powder-intercepting film 125.

As has been described above, according to the second embodiment, the moist powder is filled in the molding cavities, and at least one of the surfaces of the moist powder in each of the cavities is pressed by the molding die through the powder-intercepting film so as to form the moist powder into the shape of a tablet. In consequence, the powder-intercepting film is interposed between the moist powder in the molding cavities and the molding dies, to thereby solve the conventional problem caused by the moist powder sticking to the molding dies. Thus, a method and an apparatus for efficiently manufacturing tablets of high accuracy and quality which are easy for persons of advanced age and infants to take can be achieved.

Also, as the tablet manufacturing apparatus, the first and second tables which partially contact with each other and are relatively moved to each other are used, and the moist powder supplied in the filling holes of the first table is pressurizingly filled in the mold cavities of the second table by the filling pins at the location where the first and second tables overlap with each other, and then, the surface of the filled moist powder is leveled by removing the excessive powder by relatively moving the first and second tables with respect to each other. Accordingly, it is easy to deal with the moist powder so that the productivity is improved, a ratio of void defect of a tablet is lowered, and dispersion of weight and size of the tablets is minimized. Thus, it is possible to manufacture tablets of high precision and quality which are high in mechanical strength and superior insolubility and collapsibility.

What is claimed is:

1. A tablet manufacturing apparatus comprising:

conveyer means including a plurality of molding cavities;

supply means for supplying moist powder into said molding cavities;

first and second means for pressing said supplied moist powder by molding dies through powder-intercepting films on opposite sides of said molding cavities so as to form the moist powder into pressed tablet forms.

2. A tablet manufacturing apparatus according to claim 1, wherein said first and second means for pressing further includes finish-forming means for chamfering the upper and lower surfaces of the moist powder within said molding cavities for rounding off the corners of the mass of the moist powder and with said powder-intercepting film being located between the upper and lower surfaces of the moist powder in said molding cavities, and said finish-forming means, and further comprising means for coating a releasing agent on the surfaces of the powder-intercepting film before the upper and lower surfaces of the moist powder are chamfered by said finish forming means.

3. A tablet manufacturing apparatus according to claim 1 with said powder-intercepting film being made of an anti-adhesion material for preventing moist powder from adhering to said powder intercepting film.

4. A tablet manufacturing apparatus according to claim 1 further comprising:

a first table including a plurality of filling holes constructed and arranged such that said moist powder can be successively supplied to said groups of filling holes, said first table being mounted for rotation about a first axis;

a second table being mounted for rotation about a second axis and including a plurality of groups of said molding cavities, said second table being overlaid by at least a part of said first table such that said molding cavities of said one of said groups of said molding cavities are coaxially aligned below corresponding filling holes of said one of said groups of said filling holes where said part of said first table overlays said second table;

filling and pressurizing means for moving the moist powder from said filling holes into said molding cavities under a pressurized condition, said filling and pressurizing means comprising filling pins where said part of said first table overlays said second table; said filling pins being of a size slightly smaller than that of said filling holes whereby said filling pins can move into said filling holes, said filling and pressurizing means including support means for supporting said filling pins for coaxial movement relative to coaxially aligned filling holes and molding cavities for engagement with the moist powder in said filling holes; and means for moving said first and second tables relatively with respect to each other.

5. A tablet manufacturing apparatus according to claim 4, further including film feeders for feeding said powder-intercepting films in the form of tape synchronously with the shifting pitch of said molding cavities in response to rotation of said second table about said second axis while applying said powder-intercepting films with tensile force.

6. A tablet manufacturing apparatus according to claim 4, further comprising means for drying said pressed tablet forms in said molding cavities to form tablets.

7. A tablet manufacturing apparatus according to claim 4, wherein said first and second means for pressing further includes finish-forming means for chamfering the upper and lower surfaces of the moist powder within said molding cavities for rounding off the corners of the mass of the moist powder and with said powder intercepting film being located between the upper and lower surfaces of the moist powder in said molding cavities and said finish forming means.

8. A tablet manufacturing apparatus according to claim 1, further comprising means for coating a releasing agent on the surfaces of the powder-intercepting film before the upper and lower surfaces of the moist powder are chamfered by said finish forming means.

9. A tablet manufacturing apparatus according to claim 7, with said finish forming means having end faces engageable with said powder-intercepting film and against the upper and lower surfaces of the moist powder and further comprising coating means for coating a releasing agent on said powder-intercepting film before engagement of said end faces for chamfering the upper and lower surfaces of the moist powder.

10. A tablet manufacturing apparatus according to claim 7 with said powder-intercepting film being made of an anti-adhesion material for preventing moist powder from adhering to said powder intercepting film.

11. A tablet manufacturing apparatus according to claim 1, said apparatus further comprising:

said supply means including a hopper containing a supply of the moist powder therein;

a first table operatively associated with said hopper and including a plurality of groups of filling holes into which the moist powder is successively supplied from said hopper, said first table being mounted for rotation about a first axis, said groups of filling holes being provided in said first table at circumferentially spaced intervals about said first axis;

a second table being mounted for rotation about a second axis and including a second plurality of groups of molding cavities which are circumferentially spaced from each other about said second axis, said second table being overlaid by at least a part of said first table, one of said groups of said molding cavities being coaxially aligned below one of said groups of said filling holes such that said molding cavities of said one of said groups of molding cavities are coaxially aligned below corresponding filling holes of said one of said groups of said filling holes where said part of said first table overlays said second table;

filling and pressurizing means which include filling pins supported for axial movement into said filling holes along the axis of said filling holes for moving the moist powder from said filling holes into said molding cavities under a pressurized condition where said part of said first table overlays said second table;

said first and second means for pressing further comprising finish-forming means including upper and lower rods for chamfering the upper and lower surfaces of the moist powder as the surfaces are covered by said powder-intercepting film, to thereby round off the corners of the mass of the moist powder as they are being pressed into the pressed tablet forms;

means for drying the pressed moist powder in said molding cavities to form tablets;

release means including ejector pins for pressing and releasing said tablets out of said mold cavities; and drive means for intermittently synchronously rotating said first and second tables about said first axis and said second axis, respectively.

12. A tablet manufacturing apparatus according to claim 1, further comprising means for drying the moist powder in said molding cavities after pressing the moist powder to form the pressed tablet forms.

13. A tablet manufacturing apparatus according to claim 1, further comprising means for drying the moist powder in said molding cavities after pressing the moist powder to form the the pressed tablet forms and means for releasing the pressed tablet forms out of said molding cavities after drying.

* * * * *